United States Patent [19]

Sasaki et al.

[11] Patent Number: 5,587,535
[45] Date of Patent: Dec. 24, 1996

[54] PRESSURE SENSOR INCLUDING A PAIR OF SLIDABLE CONTACTS BETWEEN A STRAIN GAGE AND A PRINT CIRCUIT BOARD

[75] Inventors: Keiji Sasaki, Zama; Masayuki Koguchi, Yamato, both of Japan

[73] Assignee: Fujikoki Mfg. Co., Ltd., Tokyo, Japan

[21] Appl. No.: 423,147

[22] Filed: Apr. 17, 1995

[30] Foreign Application Priority Data

Jul. 8, 1994 [JP] Japan ..................... 6-157160

[51] Int. Cl.[6] ................................ G01L 9/04; G01L 1/22
[52] U.S. Cl. ........................ 73/726; 73/720; 73/756; 338/4; 338/42
[58] Field of Search .................... 73/720, 726, 706, 73/115, 721, 727, 756; 338/4, 42

[56] References Cited

U.S. PATENT DOCUMENTS

| | | | |
|---|---|---|---|
| 4,449,112 | 5/1984 | Gould | 338/39 |
| 4,767,897 | 8/1988 | Betterton et al. | 200/83 J |
| 4,993,267 | 2/1991 | Allard et al. | 73/726 |
| 5,014,557 | 5/1991 | Lawless | 73/756 |
| 5,134,888 | 8/1992 | Zylka et al. | 73/726 |
| 5,331,857 | 7/1994 | Levine | 73/756 |

*Primary Examiner*—Richard Chilcot
*Assistant Examiner*—Paul D. Amrozowicz
*Attorney, Agent, or Firm*—Foley & Lardner

[57] ABSTRACT

A pressure sensor comprises a pressure-sensitive coupler body 2 having one end provided with a diaphragm 8 and strain gage 9 stacked together, an intermediate body 3 containing a printed board 21 and encircling the strain gate 9, and a signal-detective coupler body 4 opposed to the pressure-sensitive coupler body 2 via the intermediate body 3 to define a closed chamber in the intermediate body 3. The printed board 21 and the strain gage 9 are electrically connected by terminal elements 13 extended from the strain gage 9 into slidable contact with conductive elements 25 attached to an edge of the printed board 21. Vibrations or impulses produced in the diaphragm 8 are therefore absorbed by a relative displacement between the terminal elements 13 and the conductive elements 25 to protect the printed board 21 against such vibrations or impulses.

8 Claims, 9 Drawing Sheets

PRESSURE SENSOR INCLUDING A PAIR OF SLIDABLE CONTACTS BETWEEN A STRAIN GAGE AND A PRINT CIRCUIT BOARD

BACKGROUND OF THE INVENTION

1. Field of the Invention

This invention relates to a pressure sensor for detecting the pressure of a fluid running through pipes, conduit, etc.

2. Description of the Prior Art

In automobile air conditioning systems, for example, including a compressed fluid pipe network, the pressure of a refrigerant in a refrigeration cycle is used for a predetermined control. Such a fluid pressure is detected by using a pressure sensor.

Pressure sensors for this purpose, as disclosed in Japanese Patent National Publication No. Hei 2-503831, typically have two divisional main bodies: one for receiving the pressure of a fluid and the other for outputting a voltage signal responsive to the pressure.

More specifically, as shown in FIG. 10, the pressure-receiving body comprises a pressure-sensitive coupler (c) having a pressure inlet (not shown), at one end, and a diaphragm (b), at the other end. Stacked on the diaphragm (b) is a strain gage (a).

The signal output body comprises a signal-detective coupler (d) in end-to-end engagement with the pressure-sensitive coupler (c).

An output from the strain gage (a) distorted by deflection of the diaphragm (b) is amplified before it is output to the exterior.

To this end, as disclosed in Japanese Patent National Publication No. Hei 2-503831, a printed board carrying electronic devices for amplification is mounted in the sensor, and electrically connected to a terminal element (for electrical connection to the exterior) provided in the signal-detective coupler (d).

More specifically, as shown in FIG. 10, a cavity (f) is made in the signal-detective coupler (d) to define a chamber (g) around the signal-detective coupler (d) for accommodating devices related to electrical processing.

A plurality of zig-zag-shaped clips (h) are fixed to a circumferential portion of the strain gage (a) by soldering, and a printed board (i) is supported above the strain gage (a) in the chamber (g) by grasping edges of the printed board (i) with the clips (h).

The clips (h) are also soldered to the printed board (i) to make electrical connection of the printed board (i) to the strain gage (a). The printed board (i) and the terminals of the signal-detective coupler (d) are electrically connected by another coupling structure not shown.

The diaphragm (b) in the pressure sensor of this type of structure exhibits behaviors generating vibrations or impulses due to changes in pressure of a fluid.

These vibrations or impulses in the diaphragm (b) are directly transmitted to the strain gage (a), solders (j), clips (h) and further to the printed board (i) supported on the strain gage (a) via the clips (h).

As a result, solders bonding the clips (h) to the strain gage (a) and to the printed board (i) are subject to damages such as peeling or cracking.

Particularly when the pressure sensor is used in a car, additional stress is applied to the solders due to external vibrations or impulses, large changes in temperature, etc., and increases damages to the solders.

This invites destruction of the electrical connecting line from the strain gage (a) to the printed board (i) and disturbs proper operation of the pressure sensor.

OBJECT OF THE INVENTION

It is therefore an object of the invention to provide a pressure sensor in which electrical connection between its strain gage to a printed board is reliably held regardless of any vibrations or impulses generated in its diaphragm.

SUMMARY OF THE INVENTION

In a first aspect of the invention, a pressure sensor comprises: a pressure-sensitive coupler body having, at one end thereof, a diaphragm deflective in a first direction in response to a pressure introduced from a pressure inlet and a strain gage overlying the diaphragm for detecting deflection of the diaphragm; an intermediate body having a short cylindrical shape and coupled onto the pressure-sensitive coupler body to encircle the strain gage; a signal-detective coupler body coupled onto the intermediate body in an opposed relation with the pressure-sensitive coupler body to define a closed chamber in the intermediate body, and having at least one external-connective terminal for electrical connection to the exterior of the pressure sensor; a printed board supported in the closed chamber of the intermediate body and carrying electronic parts thereon; a first connector electrically connecting the printed board to the terminal of the signal-detective coupler body; and a second connector electrically connecting the strain gage to the printed board by slidable contact between at least one pair of slidable contact members which are brought into slidable contact from a second direction approximately orthogonal to the first direction.

In a second aspect of the invention, one of the pair of slidable contact members of the second connector is a terminal element extending beside the printed board in a direction parallel to the first direction, and the other of the pair of slidable contact members of the second connector is a conductive element attached to the printed board and getting into slidable contact with the terminal from the second direction.

In a third aspect of the invention, in order to establish electrical connection between the printed board to the signal-detective coupler body without applying a stress to the printed board, the first connector comprises: at least one plug portion extending from said external-connective terminal and projecting from the signal-detective coupler body toward the intermediate body; at least one receptacle provided in the intermediate body for receiving the plug portion therein when the signal-detective coupler body is mounted onto the intermediate body; and at least one electrically conductive member resiliently connecting the receptacle to the printed board.

In a fourth aspect of the invention, the strain gage is made by stacking a gage pattern on the diaphragm in order to reliably holding the strain gage on the diaphragm with a high accuracy and without peeling, cracking or other physical problems.

In a fifth aspect of the invention, for purposes of realizing a male-type pressure sensor without leakage of a fluid, the pressure-sensitive coupler body is made by forging of a metal material into a configuration having an interior path wide at one end adjacent the diaphragm and narrow at the other end adjacent to the pressure inlet; the pressure-sensitive coupler body having a male screw on an outer circumferential surface of a first portion thereof extending over a length from one end adjacent to the pressure inlet.

In a sixth aspect of the invention, for purposes of joining the pressure-sensitive coupler body, intermediate body and signal-detective coupler body altogether without using an additional joint member, the pressure-sensitive coupler body comprises an expanded cylindrical portion concentrically radially expanded from the first portion to define a hollow interior with a diameter larger than that of the first portion to encircle outer circumferential surfaces of the intermediate body, the expanded cylindrical portion having an end bent onto an outer circumferential edge of the signal-detective coupler body.

According to the first aspect of the invention, the printed board is mounted one the intermediate body other than the strain gage and independently separate from the strain gage. At the same time, the printed board and the strain gage are electrically connected by slidable contact between a pair of slidable contact members movable in the direction substantially parallel to the first direction in which the diaphragm deflects.

Therefore, vibrations or impulses generated in the diaphragm are not transmitted directly to the printed board. They are rather absorbed by a relative displacement between the pair of slidable members electrically connecting the strain gage and the printed board. This contributes to minimization of the stress applied to the printed board, and hence prevents peeling, cracking or other damages to the solders which were inevitable in conventional sensors. As a result, the electrical connection line from the strain gage to the printed board is maintained in a good condition.

According to the second aspect of the invention, by using the simple structure in which the terminal standing from the strain gate slidably contacts with the conductive member on the printed board, vibrations and impulses generated in the diaphragm are absorbed, and the electrical connection line between the printed board and the strain gage is maintained reliably.

According to the third aspect of the invention, as the signal-detective coupler body is coupled onto the pressure-detective coupler body, the plug portion extending from the signal-detective coupler body automatically enters in the receptacle in the intermediate body and electrically connects the external-connective terminal to the printed board.

Since electrical connection between the receptacle and the printed board is made via the electrically conductive member having a resiliency, impulses generated upon assembling the signal-detective coupler body are resiliently absorbed by the electrically conductive member and not transmitted to the printed board. As a result, no stress is applied to the printed board when the signal-detective coupler body is connected to the printed board.

According to the fourth aspect of the invention, direct stacking of the strain gage onto the diaphragm contributes to reliable holding the strain gage on the diaphragm with a high accuracy and without peeling, cracking or other physical problems.

According to the fifth aspect of the invention, no additional adapter is necessary for mounting the pressure sensor to a desired system which needs a male-type sensor. Omission of such an additional adapter contributes to preventing gaps between parts or elements which may cause a leakage of a fluid experienced with conventional pressure sensors.

According to the sixth aspect of the invention, the pressure-sensitive coupler body, intermediate body, and signal-detective coupler body can be joined without using an additional joint member, only by coupling them to accommodate the intermediate body and the signal-detective coupler body in the expanded cylindrical portion of the pressure-sensitive coupler body and then bending the end portion of the expanded cylindrical portion onto the signal-detective coupler body, an expanded cylindrical portion concentrically radially expanded from the first portion to define a hollow interior with a diameter larger than that of the first portion to encircle outer circumferential surfaces of the intermediate body, the expanded cylindrical portion having an end bent onto an outer circumferential edge of the signal-detective coupler body.

DETAILED DESCRIPTION OF THE PREFERRED EMBODIMENTS

Figure 1:
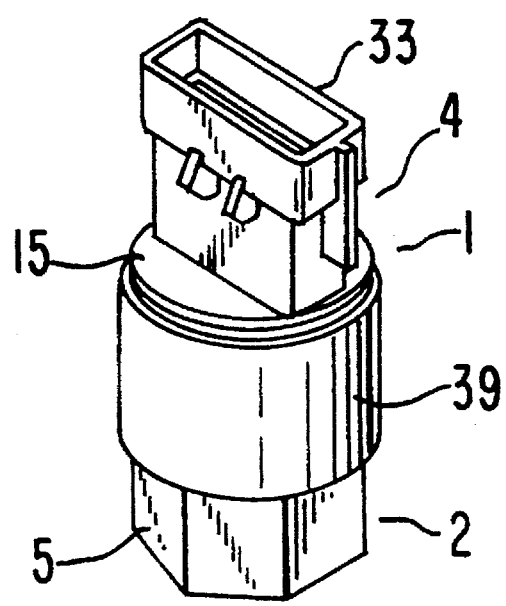
FIG. 1 is a perspective view illustrating an outer appearance of a pressure sensor taken as a first embodiment of the invention.

The invention is explained below in detail with reference to the drawings.

FIGS. 1 to 7 illustrate a pressure sensor according to a first embodiment of the invention.

The pressure sensor, labelled with 1, generally comprises a pressure-sensitive coupler body 2, intermediate body 3, and a signal-detective coupler body 4, which are coaxially coupled in series, as shown in FIGS. 2 to 5.

The pressure-sensitive coupler body 2 is a substantially cylindrical member made of a metal such as SUS or aluminum alloy and having a closed end and an open end. The pressure-sensitive coupler body 2 includes a hexagonal nut portion extending from its open end in its substantially entire length and having a female screw 5a on its inner circumferential wall. The open end of the hexagonal nut portion 5 defines a pressure inlet 6, and the interior space defines a fluid path 7.

The end wall at the closed end of the pressure-sensitive coupler body 2, where the fluid path 7 terminates, has a small thickness to behave as a diaphragm 8 which is deflective with changes in pressure of a fluid running through the pressure inlet 6.

A strain gage 9 is mounted on one surface of the diaphragm 8 opposite from the fluid path 7. The strain gage 9 is directly stacked onto the diaphragm 8 to precisely follow the deflection of the diaphragm 8 as shown in FIG. 7.

More specifically, the strain gage 9 is made by first making an insulating film 10 on the surface of the diaphragm 8 by stacking an insulating material, then making a gage pattern 11 on the upper surface of the insulating film 10 by vapor deposition and selective etching of copper or copper alloy, for example, and finally making a protective film 12 on the gage pattern 11.

Figure 2:
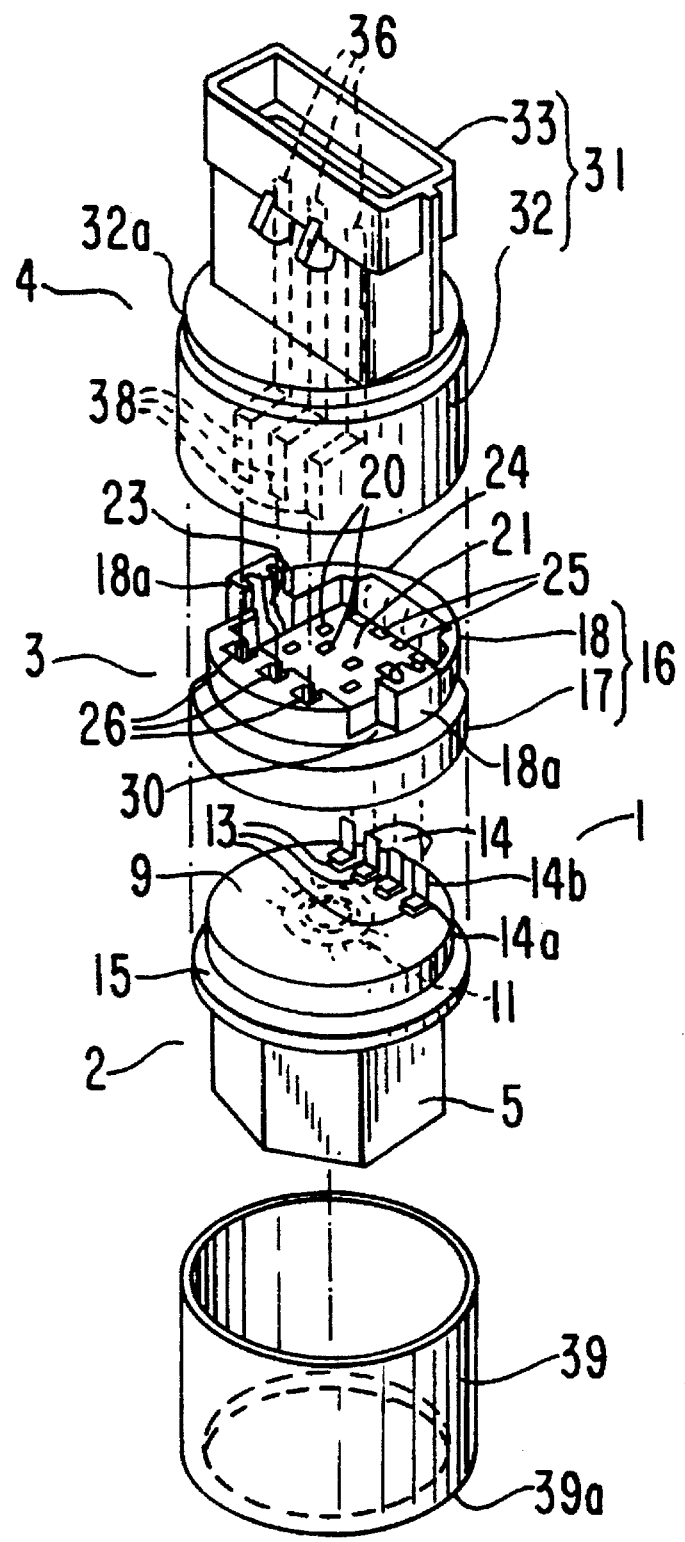
FIG. 2 is an exploded perspective view of the pressure sensor.
Figure 7:
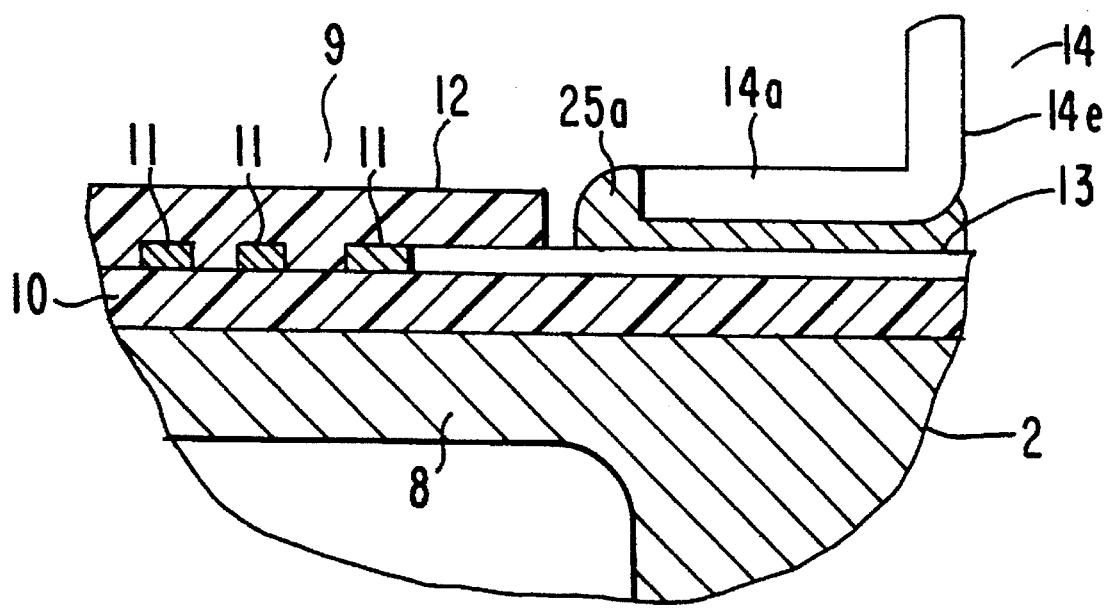
FIG. 7 is a fragmentary, cross-sectional view of the pressure sensor, showing the structure of a site A of FIG. 4 in an enlarged scale.

Made on an outer circumferential portion of the strain gage 9 are four terminal sites 13 aligned in the diameter direction as shown in FIGS. 2 and 7. Terminals 14 (each behaving as one part of a pair of slidable contacts explained later) extend from the terminal sites 13 in aside-by-side aligned relationship.

More specifically, each of terminals 14 comprises a flat spring bent into a shape similar to the letter L, and its shorter extension 14a is bonded to the terminal sites 13 by soldering so that its longer extension 14b extends in parallel to the deflective direction of the diaphragm 8.

Numeral 15 denotes a flange provided along the outer circumference of the hexagonal nut portion 5 at a location near the diaphragm 8, and 25 (shown in FIG. 7 only) denotes the solder which secures the terminals 14 to the terminal sites 13.

Figure 4:
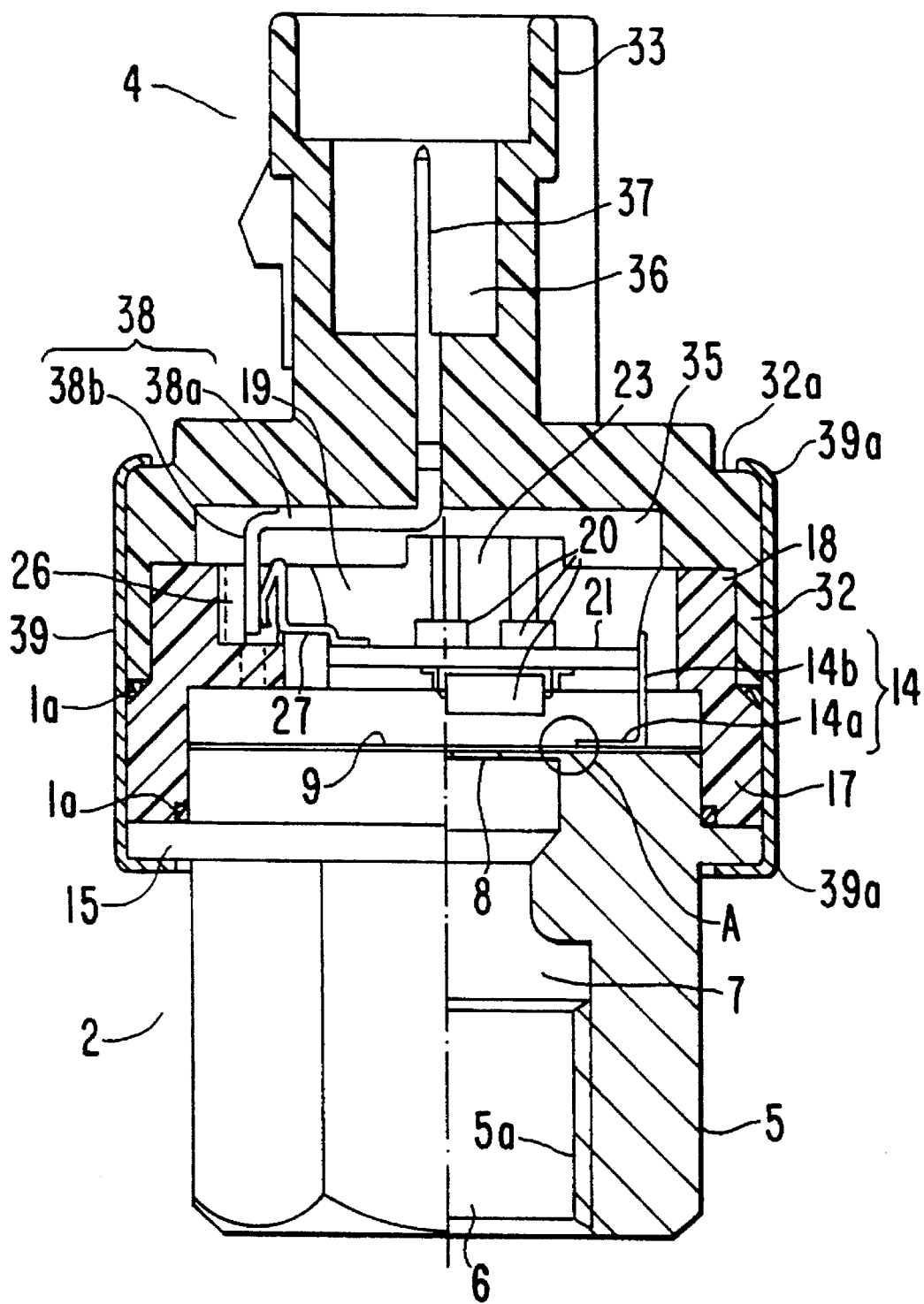
FIG. 4 is a cross-sectional view of the pressure sensor.
Figure 5:
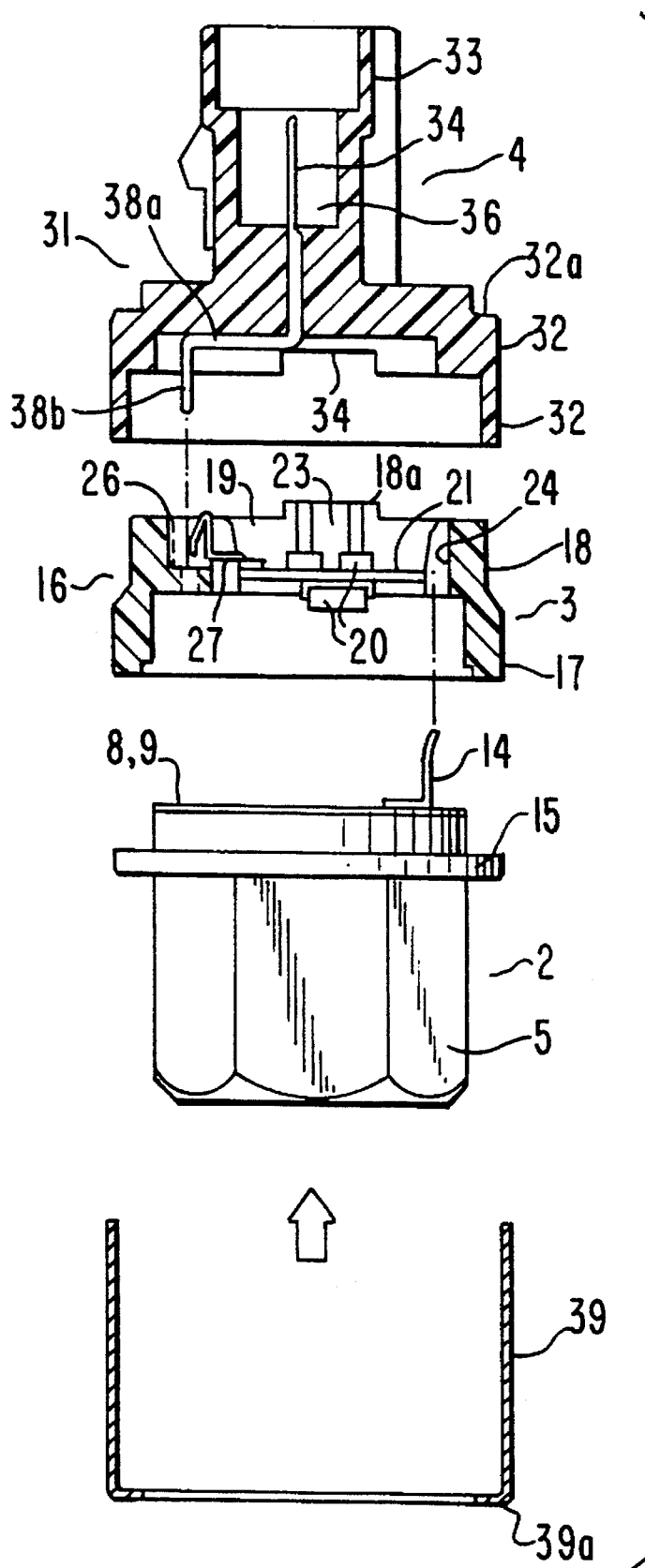
FIG. 5 is an exploded cross-sectional view of the pressure sensor.

The intermediate body 3 includes a ring-shaped main portion 16 made of an insulating material such as plastic resin. A lower half of the main portion 16 constitutes a large-diameter portion 17 having an inner diameter corresponding to the outer diameter of the opposed end of the pressure-sensitive coupler body 2 and having an outer diameter corresponding to the outer diameter of the flange 15, as shown in FIGS. 4 and 5, such that the intermediate body 3 removably engages with the opposed end of the pressure-sensitive coupler body 2. The large-diameter portion 17 is long enough to accommodate the upper part of the pressure-sensitive coupler body 2 from the flange 15 to the strain gage 9.

Figure 3B:
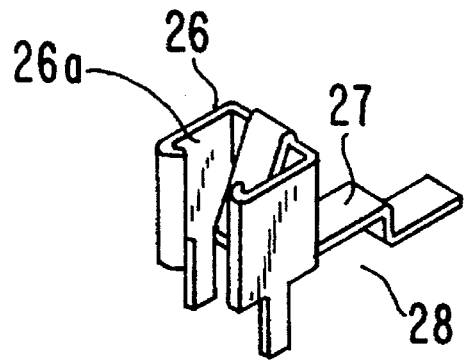
FIG. 3 is an exploded perspective view of parts or elements of an intermediate body of the pressure sensor and a printed board incorporated in the intermediate body.
Figure 3A:
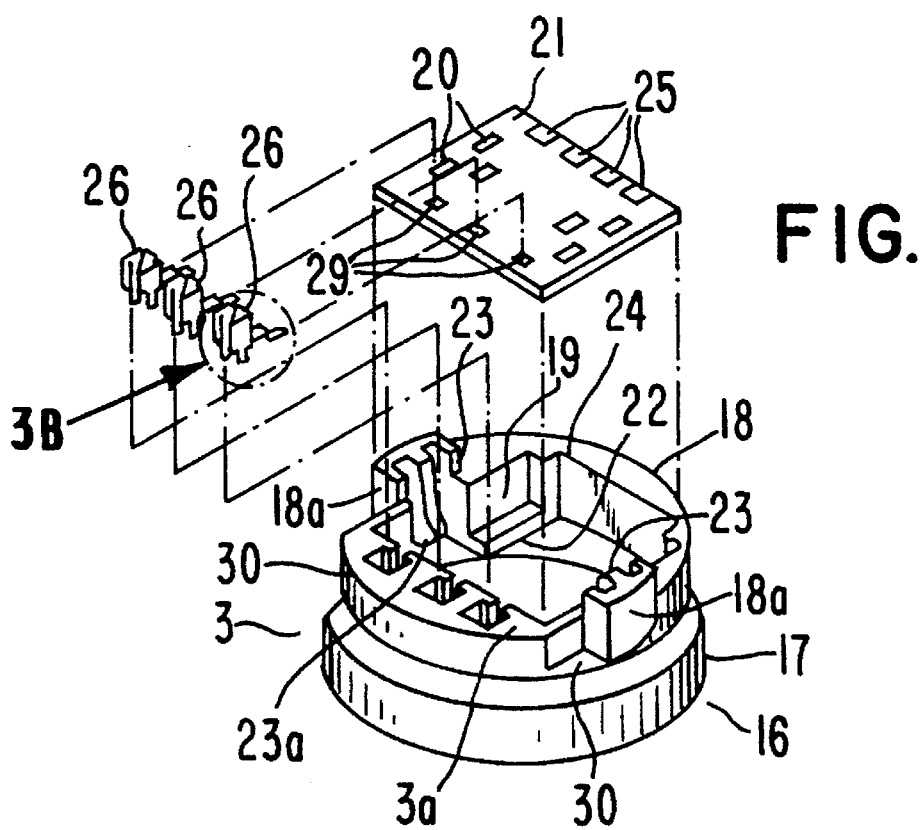

An upper half of the main portion 16 constitutes a small-diameter portion 18 having a rectangular opening 19 at an eccentric location as shown in FIGS. 2 and 3. Thus the strain gage 9 is housed in the large-diameter portion 17 and the small-diameter portion 18 of the intermediate body 3.

Mounted in the rectangular opening 19 of the intermediate body 3 is a rectangular printed board 21 carrying electronic elements or devices 20 making an amplifier circuit.

Figure 6:
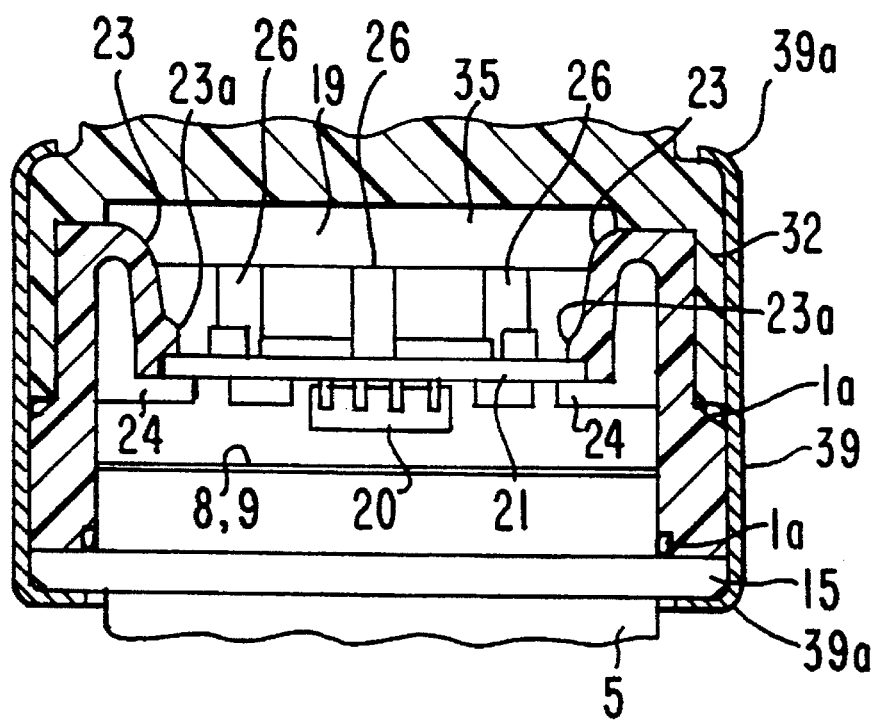
FIG. 6 is a cross-sectional view of the intermediate body and adjacent members, taken along a different line from that of FIG. 4.

More specifically, as shown in FIG. 6, among wall surfaces defining the rectangular opening 19, two opposed ones adjacent to two terminal elements 14 located at opposite ends have platforms 22 projecting into the opening 19 from lower ends, for example, to support edges of the printed board 21. These walls also have a pair of levers 23, which serve as support members, made by shaping central sections of the walls into elongated flaps extending downward from upper ends. The levers 23 are resiliently deformable to and away from each other about their upper ends fixed to the walls. These levers 23 have projections 23a projecting into the opening 19 from their lower front surfaces at a given height from the platform 22 corresponding to the thickness of the printed board 21. While the printed board 21 is press-inserted in the rectangular opening 19, the levers 23 are once pressed back by the printed board 21; but, when the printed board 21 reaches the platforms 22, the levers 23 resiliently return forward and tightly hold the printed board 21 between the platforms 22 and their projections 23a.

One of the other opposed walls of the opening 19 adjacent to the terminal sites 13 of the strain gage 9 has a cavity 24 to provide a space between the edge of the printed board 21 and the wall surface to permit the terminals 14 from the terminal sites 13 to stand up into contact with an adjacent edge of the printed board 21 when the intermediate body 3 is mounted to the pressure-sensitive coupler body 3.

The printed board 21 has conductive elements 25 (each behaving as the other of the pair of slidable contacts) along one edge for engagement with the terminals 14, so that they get into slidable contact with the terminals 14 from a direction orthogonal to the deflective direction of the diaphragm 8. As a result, electrical connection between the printed board 21 and the strain gage 9 is made by a slidable contact of the terminals 14 and the conductive elements 25, which absorbs deflection of the diaphragm 8 (second connection).

Although the terminals 14 from the terminal sites 13 are held in resilient contact with the conductive elements 25, their contacts may be soldered, if appropriate.

The small-diameter portion 18 of the intermediate body 3 also defines a flat land 3a at a location opposite from the cavity 24. Embedded in the flat land 3a are a plurality of (three, for example) receptacles 26 at predetermined intervals to open upward (as labelled with 26a) upward. The number of the receptacles 26 depends on the configuration of the adjacent end of the printed board 21 as shown in FIG. 3.

Each receptacle 26 has an integral flat spring 27 (conductive member) extending toward the printed board 21 as shown in FIGS. 3 to 5. The flat spring 27 has a step-shaped deflective portion 28 for removal of an external force.

Distal ends of the flat springs 27 are soldered to conductive elements 29 along an edge of the printed board 21 to maintain electrical connection between the receptacles 26 and the printed board 21 while absorbing their relative displacement, if any.

In order to provide a positional guidance, portions 18a of the small-diameter portion 18 of the intermediate body 3, where the levers 23 are made, are slightly taller than the remainder, and the outer circumferential wall of the small-diameter portion 18 is partly cut off between the levers 23 and the receptacles 26 so as to provide a pair of cutouts 30.

The signal-detective coupler body 4 has a main portion 31 made of an insulating material such as plastic resin.

As shown in FIGS. 1 and 2, the main portion 31 has, at one end, a cap portion 32 configured for engagement with the small-diameter portion 18 of the intermediate body 3, and, at the other end, an oval-cylindrical coupling case 33. The outer diameter of the cap portion 32 coincides with the outer diameter of the large-diameter portion 17 of the intermediate body 3.

The cap portion 32 is mounted around the small-diameter portion 18 of the intermediate body 3 and combined with the pressure-sensitive coupler body 2 so as to cover the opening 19 of the intermediate body 3. The space in the intermediate body 3 closed by the cap portion 32 is used as a device chamber 35 for containing the printed board 21 as explained above.

The cap portion 32 has an inner end surface having a pair of projections (not shown) and a pair of cavities 34 (see FIG. 5). The projections engage with cutouts 30 of the intermediate body 3, and the cavities 34 fit with the tall portions 18a. Electrical connection between the intermediate body 3 and the signal-detective coupler body 4 is established only when the aligning direction of the receptacles 26 coincides with the length direction of the coupling case 33.

That is, the coupling case 33 is positionally fixed when oriented in the aligning direction of the receptacles 26.

The coupling case 33 contains a plurality of (for example, three) terminals 36 fixed to extend in its length direction. The number and positions of the terminals 36 depend on those of the receptacles 26.

Each terminal 36 has an external-connective end 37 exposed to the exterior of the coupling case 33 for external connection. The other end of each terminal 36 is bent into a form similar to the letter L to behave as a plug 38. The plug 38 comprises a relay section 38a extending along the inner end surface of the cap portion 32 and a plug section 38b extending downward from the inner end surface toward the receptacle 26.

Each plug section 38b has a given length appropriate for insertion into the receptacle 26, and establishes electrical connection between the terminal 36 and the printed board 21 via the plug 38 and the receptacle 26 when the cap portion 32 is assembled onto the intermediate body 3 (first connection).

The pressure-sensitive coupler body 2, intermediate body 3 and signal-detective coupler body 4, assembled in series with the same outer diameter, are covered and held integrally by a joint means such as cylindrical collar 39 made of aluminum.

More specifically, the collar 39 has a bent edge 39a formed at its lower end to engage with the flange 15 of the pressure-sensitive coupler body 2. After the collar 39 is inserted onto the assembled structure of the pressure sensor from the hexagonal nut portion 5 to the extreme end where the bent portion 39a contacts the flange 15, the upper end of the collar 39 is bent inward onto a land 32a of the cap portion 32. Thus the assembled structure of the pressure-sensitive coupler body 2, intermediate body 3 and signal-detective coupler body 4 is fastened altogether.

Numeral 1a denotes an O-ring for sealing the interior chamber from the exterior.

Assembling of the pressure sensor will start from combining the intermediate body 3 with the pressure-sensitive coupler body 2, for example. The first step of the assembling is accomplished by determining relative positions between terminals 14 and the cavity 24 and then fitting the large-diameter portion 17 of the intermediate body 3 around the strain gage 9 of the pressure-sensitive coupler body 2. As a result, the terminals 14 enter in the cavity 24 and get into sliding contact with the conductive elements 25 along the edge of the printed board 21.

When the intermediate body 3 gets into contact with the flange 15, the strain gage 9 and the printed board 21 are automatically brought into electrical contact, and the assembling of the pressure-sensitive coupler body 2 and the intermediate body 3 is accomplished.

After that, the signal-detective coupler body 4 is assembled to the intermediate body 3.

This is accomplished by determining the orientation of the plug section 38b relative to the orientation of alignment of the receptacles 26 and then inserting the cap portion 32 of the signal-detective coupler body 4 onto the small-diameter portion 18 of the intermediate body 3.

As a result, a pair of projections and cavities 34 formed along the inner wall of the cap portion 32 engage with the cutouts 30 and the tall portions 18a of the intermediate body 3, respectively. Since this engagement gives a guidance, the plugs 38b extending from the terminals 36 automatically enter into the receptacles 26.

When the cap portion 32 fully advances until contacting with the cutouts 30 and the tall portions 18a of the intermediate body 3, the assembling of the signal-detective coupler body 4 is accomplished, and it is joined to the pressure-sensitive coupler body 2 via the intermediate body 3, aligned in series, representing a continuous, substantially uniform outer diameter.

On the assembled structure of the pressure-sensitive coupler body 2, intermediate body 3 and signal-detective coupler body 4, the collar 39 is engaged from the hexagonal nut portion 5 to a full extent where the bent portion 39a contacts with the flange 15. Thereafter, the upper end of the collar 39 is bent onto the land 32a of the cap portion 32 to complete the pressure sensor as shown in FIGS. 1 to 4.

For an actual use of the pressure sensor, the pressure sensor is incorporated into a desired system requiring a pressure detection, such as air conditioning pipe system, by screw engagement of the hexagonal nut portion 5 with a detective port of the pipe system, and by electrically connecting an external device to the terminals 36 through appropriate connectors (not shown).

Then the pressure in the pipe system is detected through the strain gage 9 which represents a strain responsive to a deflection of the diaphragm 8. Output voltage from the strain gage 9 is amplified by an amplifier circuit made on the printed board 21, and the amplified output voltage is taken as a value indicative of the pressure and supplied from the terminal 36 to the exterior.

In this process, the pressure sensor according to the invention is free from problems caused by vibrations and impulses occurring in the diaphragm 8, such as peeling or cracking of the solder connecting the strain gage 9 to the printed board 21, which were often experienced with conventional pressure sensors.

That is, in the pressure sensor according to the invention, since the printed board 21 is supported by the intermediate body 3 which is separate and independent from the strain gage 9, vibrations or impulses generated in the diaphragm 8 are not transmitted directly to the printed board 21.

Moreover, since electrical connection from the strain gage 9 to the printed board 21 is made by the conductive elements 25 and terminals 14 which are held in slidable contact, vibrations or impulses generated in the diaphragm 8 are absorbed by a relative displacement between the terminals 14 and the conductive elements 25, and a stress, if any, to the printed board 21 or to the solder 25a is minimized.

Therefore, the printed board 21 is protected from vibrations or impulses generated in the diaphragm 8, and conventional problems such as cracking of the solder used for electrical connection of the printed board can be removed. As a result, the electrical conductive line from the strain gage 9 to the printed board 21 is maintained in a good condition, and the reliability of the pressure sensor is improved. Moreover, these effects are obtained by the simple structure only using slidable contact between the conductive elements 25 of the printed board 21 and the terminal elements 13 extending from the strain gage 9.

The structure employed for electrical connection between the printed board 21 and the signal-detective coupler body 4 contributes to removal of impulses applied to the printed board 21 upon assembling the signal-detective coupler body 4. That is, the receptacles 26 are provided in the intermediate body 3 and are connected to the printed body 21 via flat springs 27, so that, while the plug elements 38 projecting from the inner surface of the cap portion 32 are inserted into the receptacles 26, any impulses attendant to the insertion are absorbed by resilient deformation of the flat springs 27.

The positional alignment between the receptacles 26 and the plug elements 38 is readily attained by only assembling the signal-detective coupler body 4 onto the intermediate body 3 by using engagement between the tall portions 18a of the intermediate body 3 and the cavities 34 of the cap portion 32 as a guide.

The use of the strain gage 9 made by direct deposition of the gage pattern 11 onto the diaphragm 8 ensures a reliable integral structure of the diaphragm 8 and the strain gage 9 without causing its peeling, and hence contributes to a high reliability of the pressure sensor.

Figure 8:
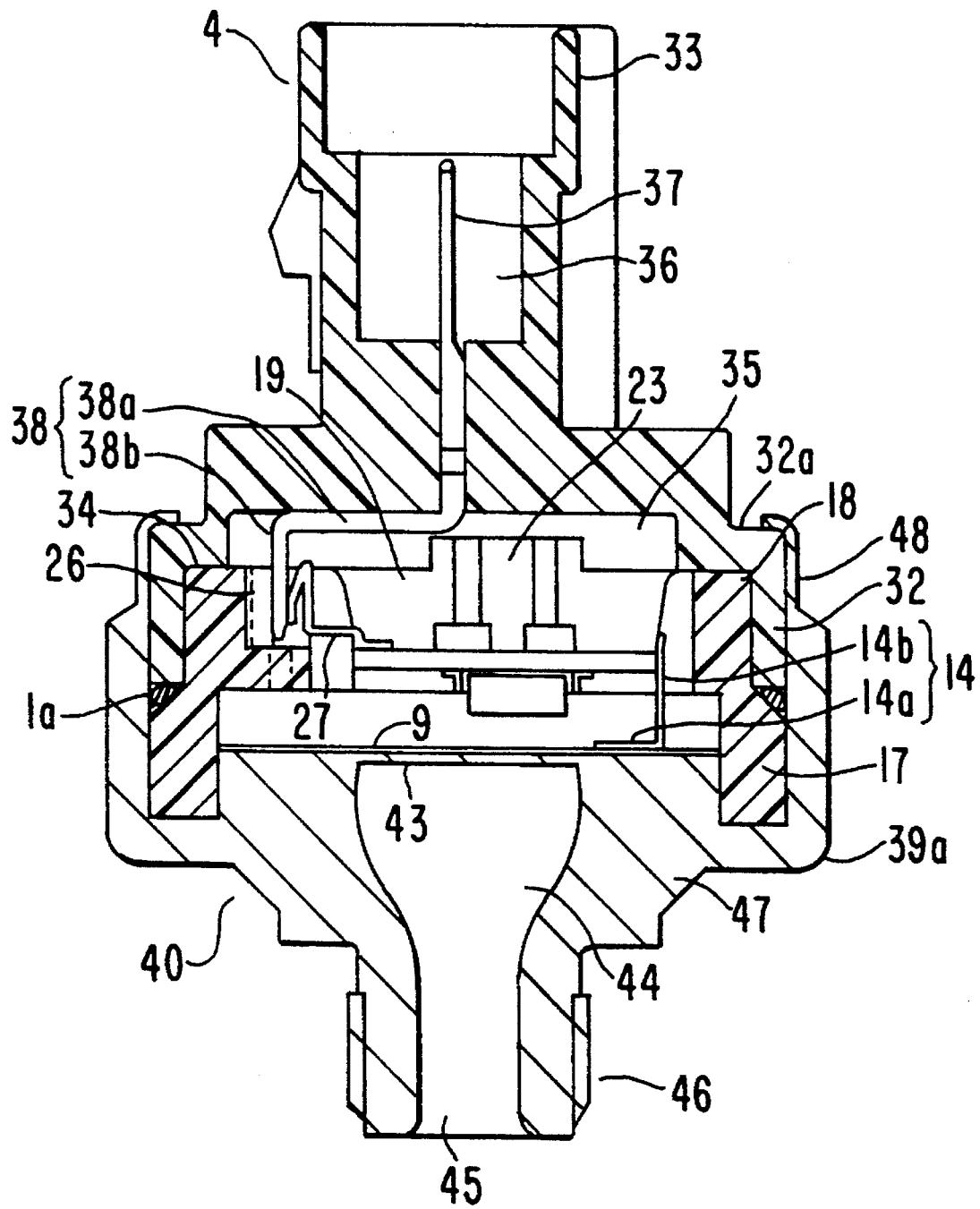
FIG. 8 is a cross-sectional view of a pressure sensor according to a second embodiment of the invention.
Figure 9:
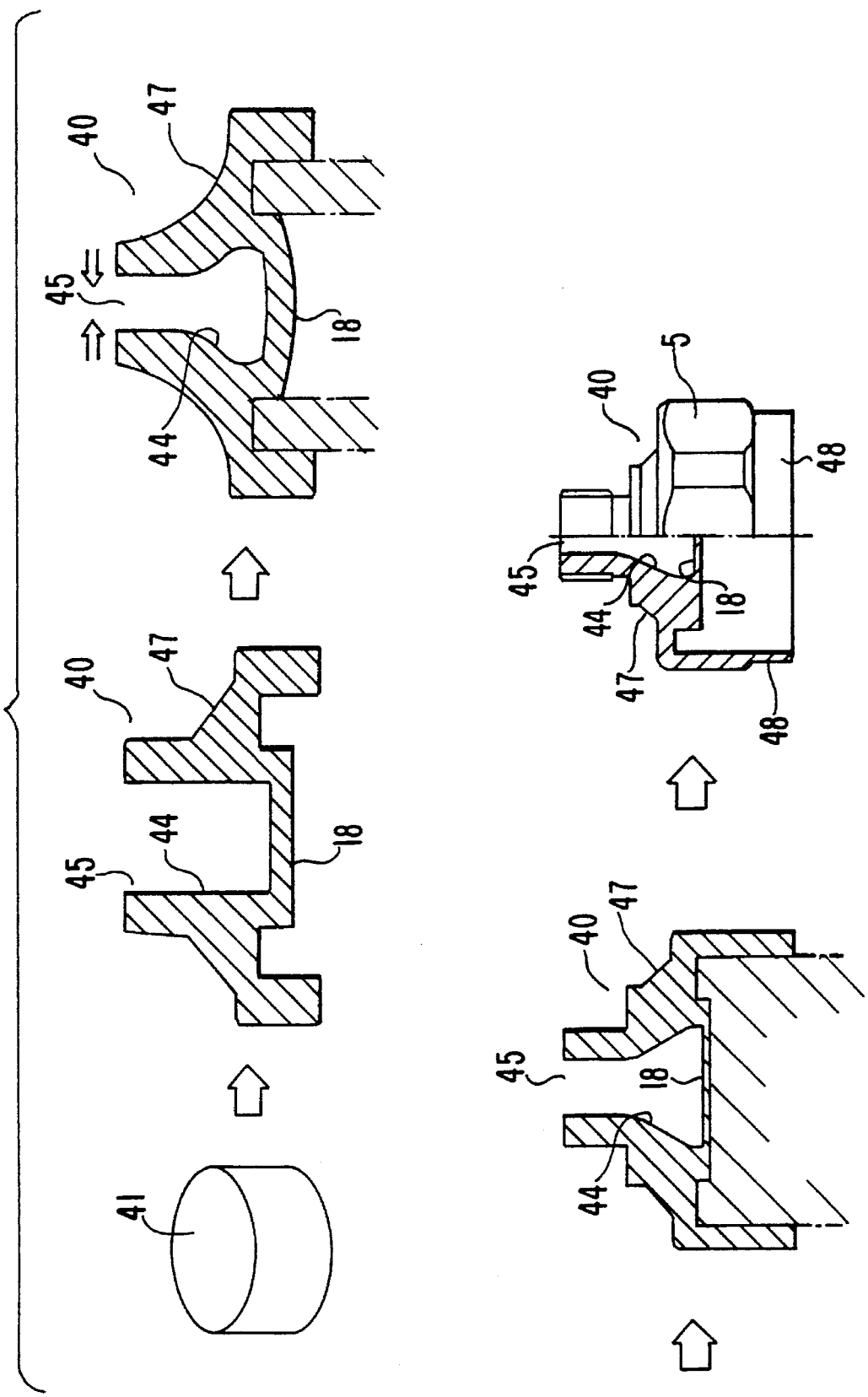
FIG. 9 is a diagram showing a process for fabricating a pressure-sensitive coupler body of the pressure sensor shown in FIG. 8.
Figure 10:
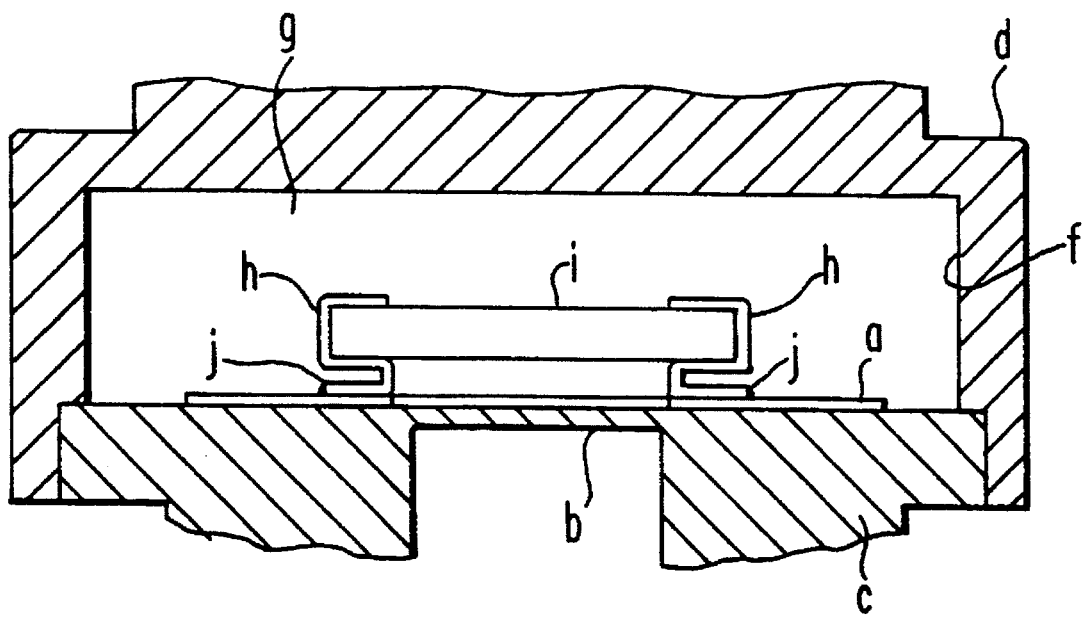
FIG. 10 is a cross-sectional view of a structure for supporting a printed board in a conventional pressure sensor.

FIGS. 8 and 9 illustrate a second embodiment of the invention.

The second embodiment is a modification of the pressure sensor according to the first embodiment, which does not use an additional adapter when it is mounted in a desired system requiring a male-type pressure sensor in lieu of the male-type pressure sensor according to the first embodiment.

A typical method for changing the pressure-sensitive coupler body 2 of a pressure sensor from a female type to a male type would be the use of an additional male-type adapter mounted onto the hexagonal nut portion 5. However, this method may cause gaps between respective parts, from which the fluid may outflow, and increases the entire size of the pressure sensor.

In order to avoid such problems, the second embodiment integrally makes a male-type pressure-sensitive coupler body 40 by forging without changing the sizes of the diaphragm 8 and the strain gage 9.

More specifically, with reference to FIG. 9, a cylindrical metal block 41 of SUS or aluminum alloy, for example, is shaped by forging into a general configuration having an outlined diaphragm 43, path 44 with a diameter corresponding to the size of the diaphragm 43, and a pressure inlet 45 with a diameter corresponding to the size of the path 44.

After that, the open end of the structure adjacent the pressure inlet 45 is slimmed by reducing or necking to define an outer diameter of the pressure inlet 45 corresponding to the diameter of a desired male screw.

After that, inner and outer surfaces of the structure are shaped into a desired exact configuration, and a male thread screw is made by milling the outer circumferential surface of the slimmed straight portion 46 adjacent to the pressure inlet 45. Thus the male-type pressure-sensitive coupler body 40 is completed.

That is, the male-type pressure-sensitive coupler body 40 is made by forging a metal material into a configuration having the path 44 whose diameter gradually increases from the narrow pressure inlet 45 toward the diaphragm 43, and the male screw on the outer surface of the slimmed straight portion 46.

The use of the progressively increasing diameter of the path 44 toward the diaphragm 43 makes it possible to make the male screw without decreasing the diameter of the diaphragm 43 and the sensitivity of the strain gage 9.

By using the pressure-sensitive coupler body 40, the pressure sensor having the male screw at one end can be assembled to a desired system without using an additional adapter. Therefore, the pressure sensor is free from undesired gaps and fluid leakage therethrough, which were experienced when using a female-type conventional pressure sensor as a male-type pressure sensor by using an additional adapter. Not using an adapter, this embodiment need not increase the entire length of the pressure sensor need.

When forging the pressure-sensitive coupler body 40, its half 47 remoter from the pressure inlet 45 may be shaped into an expanded cylindrical portion 48 which defines hollow cylindrical interior space having a large diameter concentric with the pressure inlet 45, as shown in FIG. 9, to behave as a color for covering the intermediate body 3 and the signal-detective coupler body 4 altogether.

By using the pressure-sensitive coupler body 40 having the expanded cylindrical portion 48, the pressure-sensitive coupler body 40, intermediate body 3 and signal-detective coupler body 4 can be joined together as shown in FIG. 8 without using an additional joint means, such as the separate collar 39 used in the first embodiment, by only coupling the pressure-sensitive coupler body 40 to the intermediate body 3 and the signal-detective coupler body 4 to surround their outer circumferential surfaces with the expanded portion 48 and bending the extreme end of the expanded portion 48 onto the outer circumferential edge of the land 32a of the cap portion 32. Numeral 48a denotes a portion of the expanded portion 48 to be bent onto the land 32a.

Members or elements in the second embodiment equivalent to those of the first embodiment are labelled with the same reference numerals in FIG. 8, and explanation is omitted on some of these members which would be apparent to those skilled in the art from the explanation of the first embodiment.

Although the invention has been shown and described with respect to preferred embodiments thereof, it should be understood by those skilled in the art that the foregoing and other changes and omissions in the form and detail thereof may be made therein without departing from the spirit and scope of the invention.

As described above, the invention having the first aspect can realize electrical conduction between the strain gage and the printed board, not affected by vibrations or impulses generated in the diaphragm, and hence realizes a reliably operative pressure sensor with a reliable electrical connection between the strain gage and the printed board.

The second aspect of the invention provides a simple structure for realizing the effects of the first aspect of the invention.

The third aspect of the invention provides smooth coupling between the printed board and signal-detective coupler body with no stress applied to the printed board, in addition to the effects obtained by the first aspect of the invention.

The fourth aspect of the invention provides reliable stacking of the strain gate on the diaphragm with a high accuracy and with no physical problems such as peeling.

The fifth aspect of the invention provides a male-type pressure sensor with a short length, which can be mounted to a desired system requiring a male-type pressure sensor, with no problem of leakage and with no need for an additional adapter.

The sixth aspect of the invention removes the need for an additional separate joint member for reliably joining the pressure-sensitive coupler body, intermediate body, and signal-detective coupler body altogether.

What is claimed is:

1. A pressure sensor, comprising:
   a pressure-sensitive coupler body having, at one end thereof, a diaphragm deflective in a first direction in response to a pressure introduced from a pressure inlet and a strain gage overlying said diaphragm for detecting deflection of said diaphragm;

an intermediate body having at least one support member, said intermediate body being coupled onto said pressure-sensitive coupler body to encircle said strain gage;

a signal-detective coupler body coupled onto said intermediate body in an opposed relation with said pressure-sensitive coupler body to define a closed chamber in said intermediate body, and having at least one external-connective terminal for electrical connection to the exterior of the pressure sensor;

a printed board supported by said at least one support member in said closed chamber of said intermediate body and carrying electronic parts thereon;

a first connector electrically connecting said printed board to said terminal of said signal-detective coupler body; and a second connector electrically connecting said strain gage and said printed board by slidable contact between at least one pair of slidable contact members which are brought into slidable contact solely from a second direction approximately orthogonal to said first direction;

wherein one of said pair of slidable contact members operatively engages said strain gage.

2. The pressure sensor according to claim 1 wherein one of said pair of slidable contact members of said second connector is a terminal element extending beside said printed board in a direction parallel to said first direction, and the other of said pair of slidable contact members of said second connector is a conductive element attached to said printed board and getting into slidable contact with said terminal from said second direction.

3. The pressure sensor according to claim 1 wherein said first connector comprises:

at least one plug portion extending from said external-connective terminal and projecting from said signal-detective coupler body toward said intermediate body;

at least one receptacle provided in said intermediate body for receiving said plug portion therein when said signal-detective coupler body is mounted onto said intermediate body; and at least one electrically conductive member resiliently connecting said receptacle to said printed board.

4. The pressure sensor according to claim 1 wherein said strain gage is made by stacking a gage pattern on said diaphragm.

5. The pressure sensor according to claim 1 wherein said pressure-sensitive coupler body is made by forging of a metal material into a configuration having an interior path wide at one end adjacent said diaphragm and narrow at the other end adjacent to said pressure inlet; said pressure-sensitive coupler body having a male screw on an outer circumferential surface of a first portion thereof extending over a length from said one end adjacent to said pressure inlet.

6. The pressure sensor according to claim 5 wherein said pressure-sensitive coupler body comprises an expanded cylindrical portion concentrically radially expanded from said first portion to define a hollow interior with a diameter larger than that of said first portion to encircle outer circumferential surfaces of said intermediate body, said expanded cylindrical portion having an end bent onto an outer circumferential edge of said signal-detective coupler body.

7. The pressure sensor according to claim 1, wherein said at least one support member comprises a lever.

8. The pressure sensor according to claim 1, wherein said one of said pair of slidable contact member is operatively connected to said strain gage by a terminal site.

\* \* \* \* \*